United States Patent
Krause

(10) Patent No.: US 11,283,514 B2
(45) Date of Patent: Mar. 22, 2022

(54) SATELLITE COMMUNICATIONS METHOD AND SYSTEM WITH MULTI-BEAM PRECODING

(71) Applicant: SES S.A., Betzdorf (LU)

(72) Inventor: Jens Krause, Trier (DE)

(73) Assignee: SES S.A., Betzdorf (LU)

( * ) Notice: Subject to any disclaimer, the term of this patent is extended or adjusted under 35 U.S.C. 154(b) by 70 days.

(21) Appl. No.: 16/965,374

(22) PCT Filed: Jan. 22, 2019

(86) PCT No.: PCT/EP2019/051447
§ 371 (c)(1),
(2) Date: Jul. 28, 2020

(87) PCT Pub. No.: WO2019/145274
PCT Pub. Date: Aug. 1, 2019

(65) Prior Publication Data
US 2021/0152238 A1   May 20, 2021

(30) Foreign Application Priority Data

Jan. 29, 2018  (EP) .................................. 18153851

(51) Int. Cl.
*H04B 10/00* (2013.01)
*H04B 7/185* (2006.01)
(Continued)

(52) U.S. Cl.
CPC ....... *H04B 7/18513* (2013.01); *H04B 7/0408* (2013.01); *H04B 7/0452* (2013.01);
(Continued)

(58) Field of Classification Search
CPC .............. H04B 7/18513; H04B 7/0408; H04B 7/0452; H04B 7/0473; H04B 7/18582;
(Continued)

(56) References Cited

U.S. PATENT DOCUMENTS 3,810,255 A    5/1974  Wachs et al.
7,706,748 B2   4/2010  Dutta
(Continued)

FOREIGN PATENT DOCUMENTS

JP   H01-286635 A1   11/1989
WO   WO 99/43104 A1  8/1999

OTHER PUBLICATIONS

Communication in Cases for Which No Other Form is Applicable for International Application No. PCT/EP2019/051447 dated Feb. 28, 2020.
(Continued)

*Primary Examiner* — Don N Vo
(74) *Attorney, Agent, or Firm* — Wolf, Greenfield & Sacks, P.C.

(57) ABSTRACT

The invention relates to a method for communicating from a plurality of gateways (10) to a satellite (14) over a set of uplink channels (12) and then towards Earth (22) in a plurality of beams (20). In that context, inter-beam interference mitigation precoding (s40) of signals intended to non-space-based receiver locations (18) is performed. At each gateway (10), precoding weightings are generated (s30) and uplink signals are transmitted (s32) to the satellite (14) in each of the uplink channels (12). At the satellite (14), the uplink signals are received (s34) from the gateways (10) over the uplink channels (12), and, for each uplink signal, a downlink signal (s36) is derived before transmitting (s38) the downlink signals towards Earth (22). In addition, constraints are defined to allow an effective inter-beam mitigation precoding processing. In other words, the method aims
(Continued)

at providing system-wide precoding when more than one gateway is used. The invention also relates to a satellite (14), a system (100), and the use of the satellite (14).

16 Claims, 10 Drawing Sheets

(51) Int. Cl.
*H04B 7/0408* (2017.01)
*H04B 7/0452* (2017.01)
*H04B 7/0456* (2017.01)
*H04B 10/118* (2013.01)

(52) U.S. Cl.
CPC ....... *H04B 7/0473* (2013.01); *H04B 7/18582* (2013.01); *H04B 10/118* (2013.01)

(58) Field of Classification Search
CPC ... H04B 10/118; H04B 7/1851; H04B 7/2041
USPC .......................................................... 398/121
See application file for complete search history.

(56) References Cited

U.S. PATENT DOCUMENTS

| | | | |
|---|---|---|---|
| 7,890,050 | B2 | 2/2011 | Karabinis |
| 2002/0041575 | A1* | 4/2002 | Karabinis ........... H04B 7/18539 370/319 |
| 2005/0260948 | A1* | 11/2005 | Regulinski ......... H04B 7/18513 455/12.1 |
| 2005/0288011 | A1 | 12/2005 | Dutta |
| 2007/0281611 | A1* | 12/2007 | Monte ................... H04W 28/16 455/13.2 |
| 2011/0075601 | A1 | 3/2011 | Zheng |
| 2012/0289225 | A1 | 11/2012 | Treesh et al. |
| 2015/0188623 | A1 | 7/2015 | Angeletti et al. |
| 2017/0149493 | A1 | 5/2017 | Arapoglou et al. |
| 2018/0069621 | A1* | 3/2018 | Tong ................... H04B 7/2041 |

OTHER PUBLICATIONS

Corrected International Preliminary Report on Patentability for International Application No. PCT/EP2019/051447 dated Mar. 16, 2020.
Extended European Search Report for European Application No. 18153851.3 dated Sep. 17, 2018.
International Preliminary Report on Patentability for International Application No. PCT/EP2019/051447 dated Feb. 13, 2020.
International Search Report and Written Opinion for International Application No. PCT/EP2019/051447 dated Mar. 28, 2019.
Notification Concerning Informal Communications with the Applicant for International Application No. PCT/EP2019/051447 dated Feb. 6, 2020.
Arnau et al., Performance study of multiuser interference mitigation schemes for hybrid broadband multibeam satellite architectures. EURASIP Journal on Wireless Communications and Networking. Dec. 1, 2012;2012(1):132.
Christopoulos et al., Linear and nonlinear techniques for multibeam joint processing in satellite communications. EURASIP journal on wireless communications and networking. Dec. 1, 2012;2012(1):162.
Christopoulos et al., Linear precoding in multibeam satcoms: Practical constraints. 31st AIAA International Communications Satellite Systems Conference. 2013:5716.
Christopoulos, Multibeam Joint Processing in Satellite Communications. Dissertation, University of Luxembourg, 2014:1-194.
Ejima et al., Digital Channelizer for High Throughput Satellite Communications. Mitsubishi Electric Advance. Sep. 2014:7-10.
Gallinaro et al., Perspectives of adopting inteference mitigation techniques in the context of broadband multimedia satellite systems. Proceedings of the ICSC. Sep. 2005:1-10.
Zheng et al., Multi-gateway cooperation in multibeam satellite systems. 2012 IEEE 23rd International Symposium on Personal, Indoor and Mobile Radio Communications—(PIMRC). Sep. 9, 2012:1360-1366.

* cited by examiner

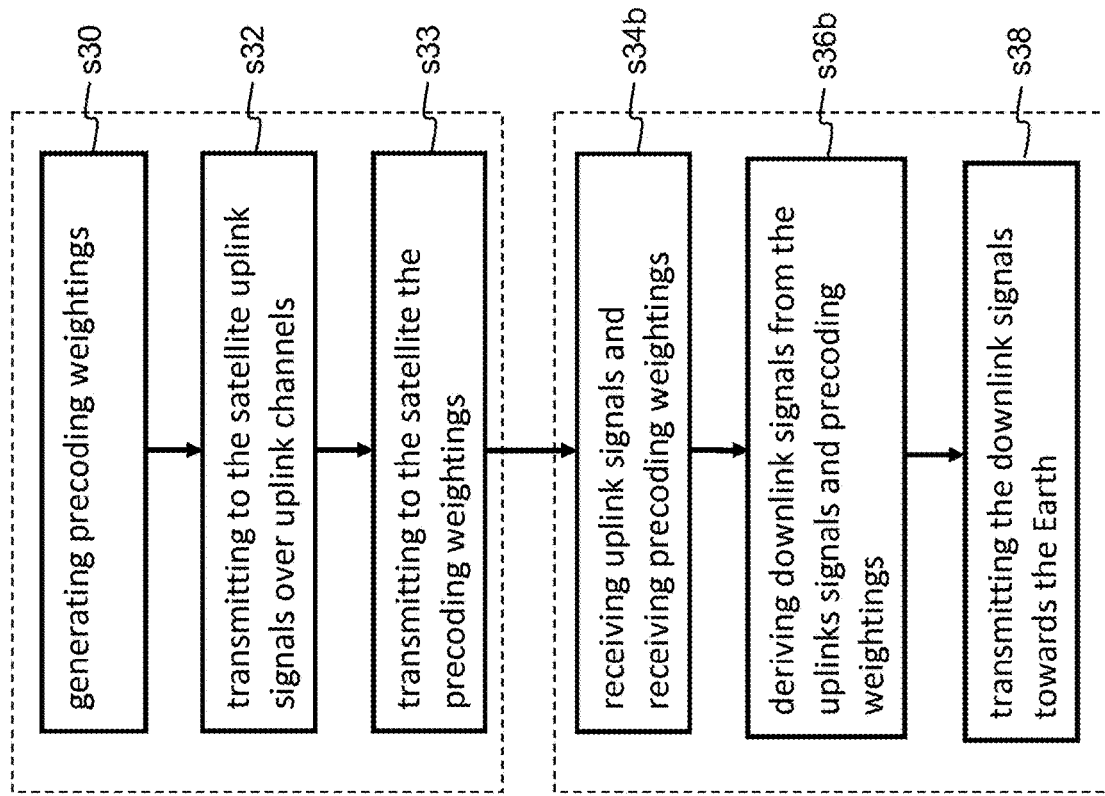
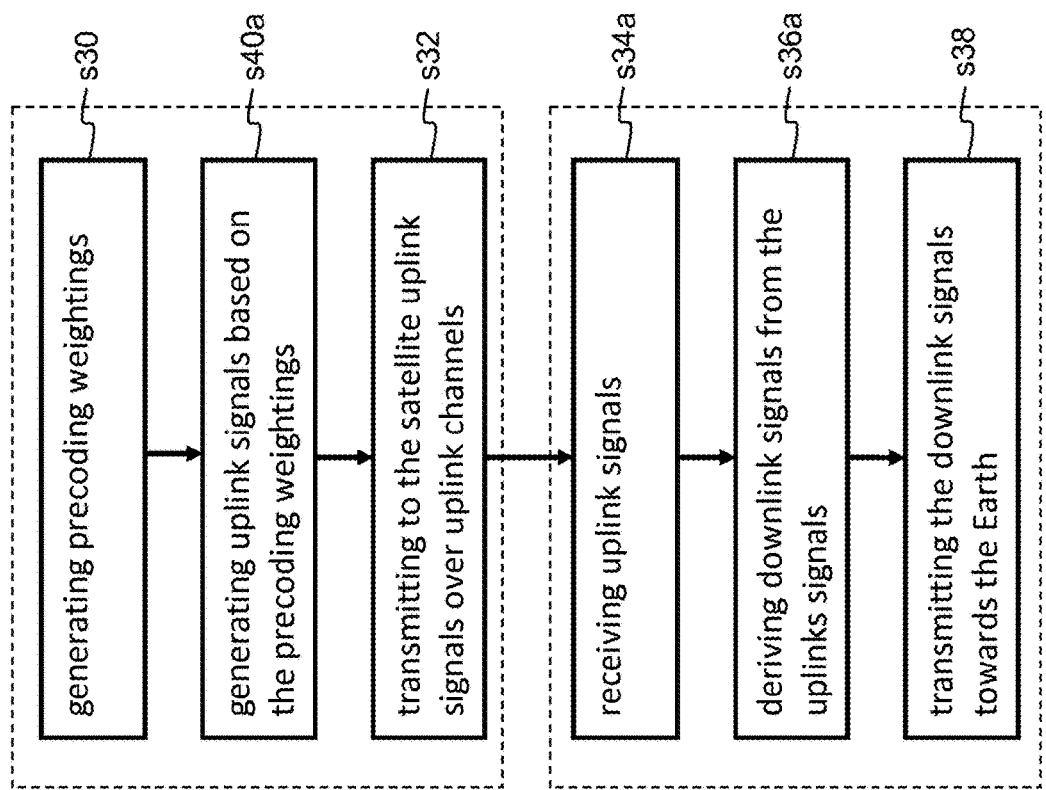
Fig. 3b
Fig. 3a

SATELLITE COMMUNICATIONS METHOD AND SYSTEM WITH MULTI-BEAM PRECODING

CROSS REFERENCE TO RELATED APPLICATIONS

This Application is a national stage filing under 35 U.S.C. 371 of International Patent Application Serial No. PCT/EP2019/051447, filed Jan. 22, 2019, entitled "SATELLITE COMMUNICATIONS METHOD AND SYSTEM WITH MULTI-BEAM PRECODING". Foreign priority benefits are claimed under 35 U.S.C. § 119(a)-(d) or 35 U.S.C. § 365(b) of European application number 18153851.3, filed Jan. 29, 2018. The entire contents of these applications are incorporated herein by reference in their entirety.

FIELD OF TECHNOLOGY

The invention relates to the fields of satellite communications and multi-beam precoding for satellite communications. It relates particularly to methods and systems for communication from a plurality of gateways to a satellite over a set of uplink channels and then from the satellite towards a plurality of non-space-based receiver locations, wherein the satellite transmits towards Earth in a plurality of beams. The invention also relates notably to a satellite. The invention may be used to, though not limited to, provide broadband satellite communications, such as to provide internet connectivity to a plurality of terminals.

BACKGROUND

In a multi-beam satellite communications system, the available, but scarce, forward downlink channel resources from the satellite towards Earth are generally reused in order to increase the overall transmission capacity, or throughput. Such a system typically relies on multi-beam satellite antennas to reuse "the Physical Layer (PHY) resources (i.e. frequency and/or polarization) several times within the coverage area" (see ref. [1], p. 27; a list of references being provided at the end of the present description).

When a given downlink channel within a frequency band is used in more than one beam, said downlink channel is said to be reused. If a plurality of different signals are transmitted through a plurality of beams over reused downlink channels in order to provide point-to-point services, increasing the frequency reuse scheme leads not only to a desired increased transmission capability, but also to an undesired increase in intra-system interference between the beams, i.e. inter-beam interference. This interference has to be mitigated to avoid quality deterioration of the point-to-point communications.

In ref. [1], p. 29, FIG. 1.1 schematically illustrates an exemplary satellite communication system having a multi-beam configuration with a four-color frequency reuse scheme, and covering a part of Europe. Even if the beams in which a frequency is reused are spatially separated, interference may still exist as a result of the side lobes of the beam radiation patterns (see ref. [1], section 1.1).

In order "[t]o address the issue of high inter-beam interference in an aggressive frequency re-use multi-beam configuration, joint processing of the signals intended for transmission to the different beams can be carried out at the forward link transmitter (usually the gateway (GW) or hub). This processing, referred to ( . . . ) under the generic term "precoding", intends to 'revert' the impact of the satellite channel and interferences" (ref. [2], paragraph [0005]).

Provided that a joint processing at the forward link transmitter is possible, the signals transmitted to the satellite over the uplink channel may already include compensations accounting for the geographical location of the receiver terminals, the signals intended for each of them, and their relative position with respect to other beams. This precoding aims at mitigating or compensating for the impact of the satellite channel and interferences. To support the joint processing, "the forward link receivers (satellite terminals, also referred to as user terminals (UTs) or simply terminals) provide accurate and timely reports of their channel (channel state information represented by a channel state vector, or simply channel vector) back to the transmitter, which the transmitter uses to form the appropriate precoding matrix" (ref. [2], paragraph [0005]).

Various types of precoding techniques are known, e.g., in terrestrial cellular radio standards, and are broadly referred to as multi-user multiple-input multiple-output (MU-MIMO) techniques, as mentioned in ref. [2], paragraph [0006]. Multi-beam precoding is also discussed for example in ref. [3], [4], and [6].

Due to feeder link limitations (the feeder link being the link between the gateway and the satellite, as shown for example in FIG. 1.1 of ref. [1]), a single gateway may not be able to accommodate all the signals to be transmitted in all the beams. More than one gateway may therefore be deployed to communicate with one satellite. However, in such a case, multi-beam joint processing cannot be performed since there is more than one gateway (see ref. [2], paragraph [0056]; ref. [5], section I., first paragraph, fourth and fifth sentences). To address that problem, several approaches have been proposed (see ref. [1], section 1.5; ref. [5], sections IV to VII.; ref. [6], section 2.2.3, second paragraph; ref. [7], section III.F).

A first approach, which aims at avoiding the problem altogether, is the use of higher frequency bands for the feeder link. Indeed, largely unused or even unexplored frequency resources are still available at higher frequencies. In this approach, a single gateway serves the multi-beam satellite (see ref. [1], section 1.5, lines 8-11; ref. [2], paragraph [0057], first sentence; ref. [5], section I., first paragraph, third sentence). This may however come at the price of a reduced overall bandwidth and additional complexity.

A second approach is the full interconnection among the multiple gateways so that they can all share the same data (see ref. [1], section 1.5, lines 11-13). This however typically causes an added delay, while, especially in field of satellite communications systems, timely communications are highly desired. Another drawback is that the interconnection between the gateways has to be physically realized while gateways are typically located far apart from each other.

Another approach consists in associating a single gateway with a given number of beams, without overall central processing but with a partial central processing that each gateway is able to perform for the beams it controls. However the numbers of beams generally required is higher than the number a single gateway is able to handle. This approach consequently means that non-accountable interferences still exist between beams controlled by different gateways (see ref. [2], paragraph [0056], third and fourth sentences; ref. [5], section IV.). This is especially marked in regions in which beams controlled by different gateways overlap.

Another strategy, based on the above approach, consists in employing a less aggressive beam re-use scheme for beams projected at border regions. A border region is a region at the border between a first plurality of beams controlled by a first gateway and a second plurality of beams controlled by a second gateway (see ref. [2], paragraph [0057], second sentence).

Finally, another approach is to perform a central precoding on board the satellite, rather than at the gateways. However, this approach is difficult to put in practice, as the precoding processing is computationally demanding and typically consumes a large amount of electrical power.

In view of the above, there is a need for solutions to effectively mitigate the inter-beam interference without unduly underusing the available physical layer resources.

SUMMARY

The present invention aims at addressing, at least partially, the above-mentioned need. The invention includes methods, satellites, and systems as defined in the independent claims. Particular embodiments are defined in the dependent claims.

In one embodiment, a method is provided for communication from a plurality of gateways to a satellite over a set of uplink channels and then from the satellite towards a plurality of non-space-based receiver locations, wherein the satellite transmits towards Earth in a plurality of beams. The method comprises, before transmission from the satellite towards Earth, inter-beam interference mitigation precoding of signals intended to each of at least some of the plurality of non-space-based receiver locations (where user terminals may be located). The method further comprises, at each of the plurality of gateways: (a) generating weightings, here referred to as "precoding weightings", for the inter-beam interference mitigation precoding; and (b) transmitting, from the gateway to the satellite, for each of the set of uplink channels, a signal, here referred to as "uplink signal", over the uplink channel. Yet furthermore, the method comprises, at the satellite: (i) receiving the uplink signals from the plurality of gateways over uplink channels; (ii) for each of the uplink signals, deriving a signal, here referred to as "downlink signal", from the uplink signal; and (iii) transmitting the downlink signals towards Earth. Furthermore, a first downlink channel is reused, in different beams among the plurality of beams, by at least two downlink signals derived from uplink signals from a first gateway among the plurality of gateways, and a second downlink channel is reused, in different beams among the plurality of beams, by at least two downlink signals derived from uplink signals from a second gateway among the plurality of gateways. Yet furthermore, there is at least one beam in common between the beams in which the first downlink channel is reused and the beams in which the second downlink channel is reused.

By enabling joint processing per downlink channel, the method allows maximizing the reuse of available physical layer resources with effective inter-beam mitigation. In other words, the method allows the provision of a system-wide precoding when more than one gateway is used.

The method also relates to a satellite for carrying out the above-described method, a system comprising such as satellite, and the use of such a satellite.

BRIEF DESCRIPTION OF THE DRAWINGS

FIG. 3a is a flowchart of a method in one embodiment of the invention, wherein the uplink signals transmitted to the satellite are generated at each of the gateways using the precoding weightings;

FIG. 3b is a flowchart of a method in one embodiment of the invention, wherein the precoding weightings generated at each of the gateways are transmitted to the satellite;

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive. A list of abbreviations and their meaning is provided at the end of the detailed description.

Figure 1:
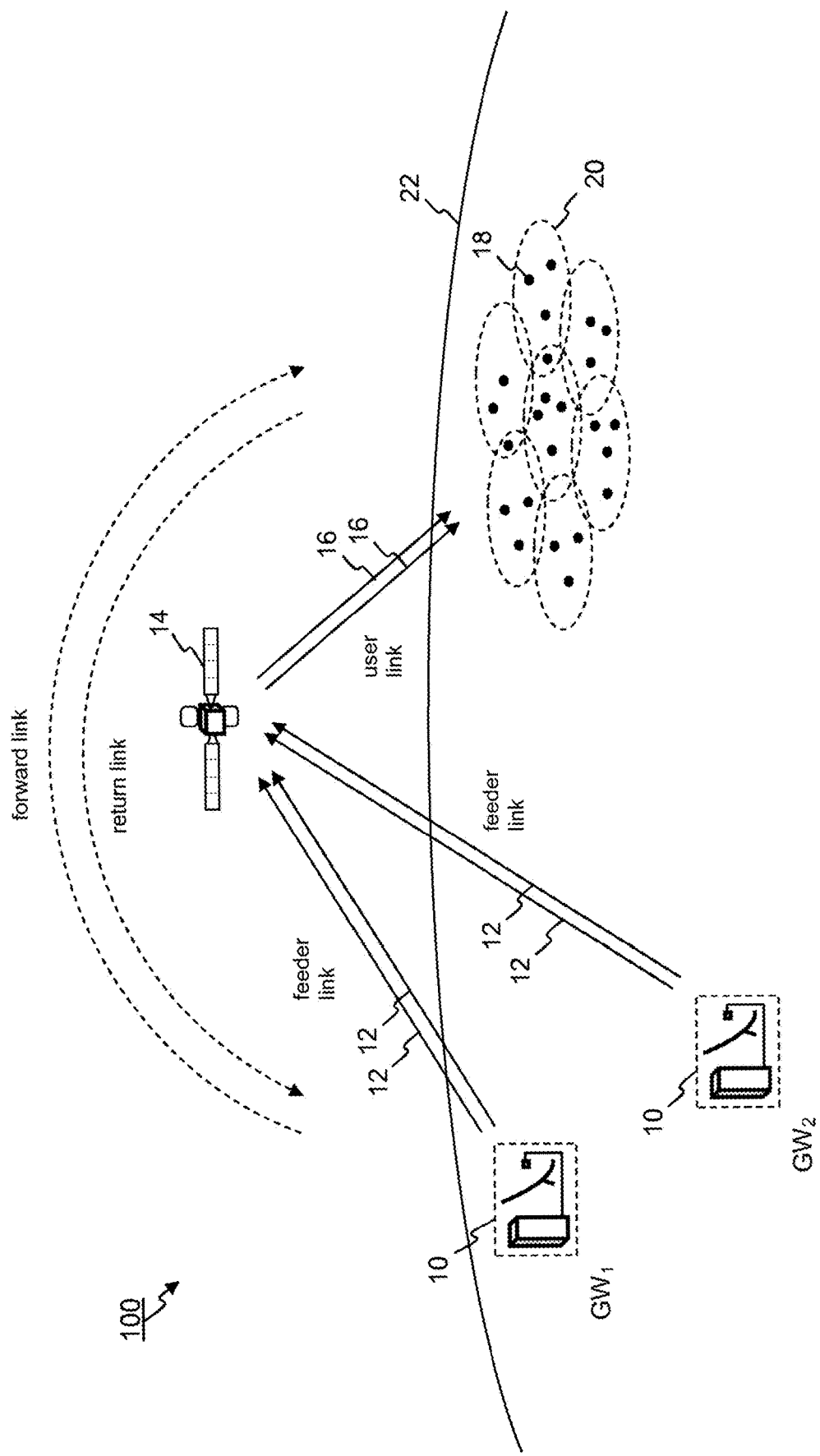
FIG. 1 schematically illustrates some aspects of a multi-beam satellite communications method and system, in one embodiment of the invention.

FIG. 1 schematically illustrates a multi-beam satellite communications system 100 in one embodiment of the invention. System 100 comprises a plurality of gateways 10 located on Earth 22 or near its surface, and a satellite 14 orbiting the Earth 22. System 100 may for example be used to provide broadband interactive services, such as a broadband internet connection, to a plurality of terminals (not illustrated in FIG. 1) being at non-space-based receiver locations 18 (schematically represented by black dots in FIG. 1), such as locations on Earth 22 or near its surface. That is, the terminals may for example be on the ground, in an airplane in flight, or on a ship, and may be user terminals.

Satellite 14 may for example orbit the Earth 22 in a geostationary or geosynchronous orbit, although the invention is not limited to these orbits. Satellite 14 receives uplink signals from gateways 10 over uplink channels 12, and transmits downlink signals in downlink channels 16 towards Earth 22 through a plurality of beams 20. To this end, satellite 14 comprises a multi-beam antenna or a plurality of antennas for forming beams 20 directed towards Earth 22.

Non-space-based receiver locations 18 are within the coverage area, i.e. within the footprint, of the beams 20 formed, i.e. emitted, by satellite 14.

Each gateway 10 may be connected to a communications backbone, one or more servers (such as database server(s), file server(s), web server(s), application server(s), or the like), and/or any other type of computer infrastructure (not illustrated in FIG. 1), so as to obtain and/or receive signals intended for the terminals being at non-space-based receiver locations 18. Although FIG. 1 illustrates two gateways 10 (labelled $GW_1$ and $GW_2$) transmitting to satellite 14, system 100 may comprise more than two gateways 10, such as for example 3, 4, 5, 10, 15, or 20 gateways transmitting to satellite 14. The term "gateway" is to be understood here as encompassing all elements required for generating the precoding weightings (i.e., the weightings used for inter-beam interference mitigation precoding, also called multi-beam precoding), for optionally generating the precoded uplink signals (in embodiments wherein satellite 14 itself is not in charge of generating the precoded uplink signals), and for transmitting precoded or non-precoded uplink signals over uplink channels 12. In one embodiment, the components of a gateway 10 may be geographically distributed to a certain extent, in the sense that they are not necessarily all at the geographical location at which the gateway's antenna is located.

Typically, gateways 10 communicating with one satellite 14 are located at a sufficient distance from each other, in such a manner that a given uplink channel 12 can be reused by the gateways 10 while, at the same, the satellite 14 is able to distinguish the uplink signals on the uplink channels 12 depending on the gateway 10 from which the uplink signal originates.

System 100 enables communication from gateways 10 to satellite 14 over a set of uplink channels 12 and then from satellite 14 towards non-space-based receiver locations 18 (and therefore towards the terminals that may be located at locations 18). This communication direction is referred to as "forward link". System 100 may also enable communication through satellite 14 in the other direction, i.e. from a terminal at a non-space-based receiver location 18 back to one of gateways 10. This communication direction is referred to as "return link". The forward and return links are schematically illustrated by curved dashed arrows in FIG. 1.

The forward link from a gateway 10 comprises, on the one hand, an uplink "feeder link" comprising a plurality of uplink channels 12 from the gateway 10 to satellite 14, and, on the other hand, a downlink "user link" comprising a plurality of downlink channels 16 from satellite 14 to terminals at non-space-based receiver locations 18. The return link to a gateway 10 comprises, on the one hand, an uplink user link (not illustrated in FIG. 1) connecting a terminal at a non-space-based receiver location 18 to satellite 14, and, on the other hand, a downlink feeder link (not illustrated in FIG. 1) connecting satellite 14 to the gateway 10. Through the return link, a terminal at a non-space-based receiver location 18 may provide, amongst other things, timely reports regarding channel status and information on the basis of which joint pre-coding processing for inter-beam interference mitigation may be performed at the gateway 10. Such timely reports, if required, may however alternatively be provided back to the gateway 10 through another return link, e.g. a terrestrial link or a link through another satellite.

In one embodiment, the processing payload of satellite 14 is said to be transparent in the sense that an uplink signal received through an uplink channel 12 is at most translated in frequency, converted in polarization (e.g. from one polarization to another, such as from RHCP to LHCP), and amplified prior to being routed and transmitted over a downlink channel 16 in a beam 20. That is, an uplink signal received through an uplink channel 12 is not demodulated in satellite 14, i.e. satellite 14 acts in a bent-pipe manner.

As mentioned above, system 100 is configured to enabling communication with terminals being at a plurality of non-space-based receiver locations 18 within the geographical area covered by a plurality of beams 20. Merely as an example, 7 beams are shown in FIG. 1. System 100 may however comprise fewer or more beams 20 than 7, such as for example 2, 3, 4, 5, 6, 8, 10, 15, 20, 30, 40, 50, 60, 80, 100, 120, 150, 200, or 250 beams. The number of beams 20 may depend on the size of the satellite's coverage area. For example, a multi-beam satellite illuminating Europe may comprise somewhere between 100 and 250 beams. These beams 20 may also be called "spot beams".

An uplink channel 12 is to be understood here as a portion of the available uplink physical resources through which an uplink signal may be transmitted. Likewise, a downlink channel 16 is to be understood here as a portion of the available downlink physical resources (especially a portion of the available frequency spectrum and available polarizations, i.e. an available "color" where a color is a combination of frequency and polarization) through which a downlink signal may be transmitted. In one embodiment, the downlink channels 16 differ from each other by: (i) their frequency, or range of frequencies; and/or (ii) their polarization, or polarizations. The frequency bands used for the downlink and uplink may be any frequency band suitable for satellite communications. Each frequency band may have its own advantages and disadvantages, as known in the art.

FIG. 1 shows, merely by way of example, two uplink channels 12 originating from gateway $GW_1$, two uplink channels 12 originating from gateway $GW_2$, and two downlink channels 16 originating from satellite 14. System 100 may, however, comprises another number of uplink channels 14 per gateway, and another number of downlink channels 16. In one embodiment, there is a large number of uplink channels 14 per gateway, such as for example more than 20, more than 50, or more than 100 uplink channels 14 per gateway, and there is a large number of downlink channels 16 per beam, such as for example more than 20, more than 50, or more than 100 downlink channels 16 per beam.

As multi-beam precoding optimizes the downlink signals for specific locations 18 within a beam 20, i.e. the location of the user terminals, multi-beam precoding is generally only applicable to unicast communications. Therefore, in one embodiment of the invention, the method enables unicast communications from gateways 10 to user terminals at the non-space-based receiver locations 18.

Figure 2:
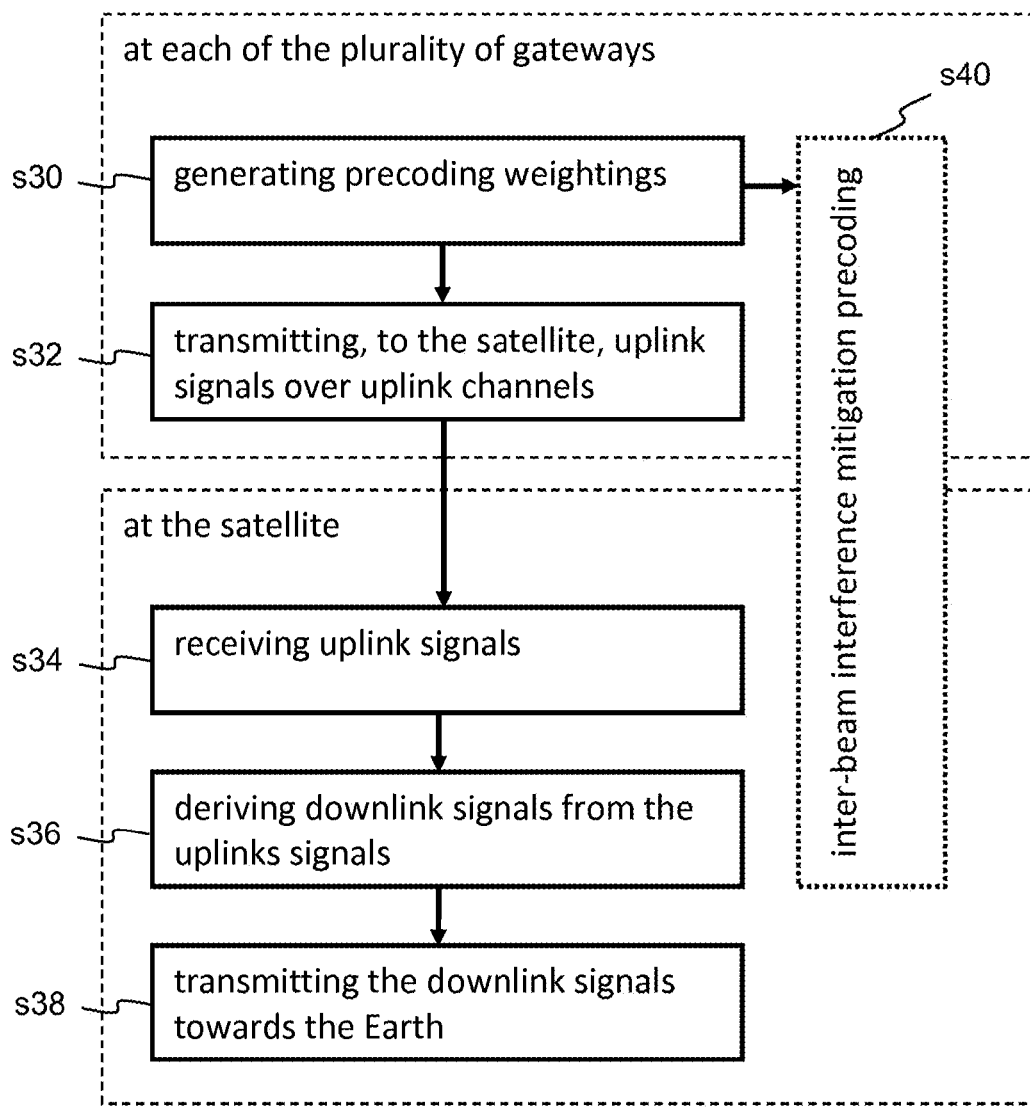
FIG. 2 is a flowchart of a method in one embodiment of the invention.

FIG. 2 is a flowchart of a method in one embodiment of the invention. Said method may be performed in a multi-beam satellite communications system 100 as illustrated in FIG. 1. FIG. 2 shows that steps s30 and s32 are performed at each of the gateways 10, whereas steps s34, s36, and s38 are performed at satellite 14. The flowchart also shows that step s40 is either performed at each of the gateways 10 (as will be discussed with reference to FIG. 3a) or at satellite 14 (as will be discussed with reference to FIG. 3b). Further, the flowchart illustrates that step s40 is performed based on the precoding weightings generated at step s30, and step s40 is performed before carrying out step s38. The method enables communication from gateways 10 to satellite 14 over a set of uplink channels 12 and then from satellite 14 towards non-space-based receiver locations 18, wherein satellite 14 transmits towards Earth 22 in a plurality of beams 20, as already discussed with reference to FIG. 1.

In particular, at each gateway 10, precoding weightings are generated s30 for the purpose of inter-beam interference mitigation precoding (as known in the art). Further, from each gateway 10, and for each uplink channel 12 among a given set of uplink channels 12, an uplink signal is transmitted s32, from the gateway 10 to the satellite 14 over the uplink channel 12.

For example, referring to FIG. 1, gateway $GW_1$ may transmit an uplink signal $ULS_{1,1}$ over an uplink channel $ULCH_1$ and an uplink signal $ULS_{1,2}$ over an uplink channel $ULCH_2$, and gateway $GW_2$ may transmit an uplink signal $ULS_{2,1}$ over uplink channel $ULCH_1$ and an uplink signal $ULS_{2,2}$ over uplink channel $ULCH_2$. In such a case, the set of uplink channels 12 comprises two uplink channels, i.e. $ULCH_1$ and $ULCH_2$. That is, each uplink channel 12 among the set of uplink channels 12 is used by both gateways $GW_1$ and $GW_2$. This, however, does not preclude a gateway from using other uplink channels outside the set of uplink channels commonly used by the gateways under consideration. Also, the given set of uplink channels commonly used by the gateways under consideration may comprise more than two uplink channels 12, as already mentioned above with reference to FIG. 1.

The uplink signals are either generated by applying the precoding weightings thereto (in such case, the uplink signals are precoded uplink signals, as will be discussed later with reference to FIG. 3a, and especially step s40a thereof), or the uplink signals are transmitted in step s32 before applying the precoding weightings (in such case, the uplink signals are non-precoded uplink signals, as will be discussed later with reference to FIG. 3b). In the latter case, the precoding weightings are also transmitted to satellite 14 (as will be discussed with reference to FIG. 3b, and especially step s33 thereof).

Furthermore, as also illustrated in FIG. 2, at the satellite 14, the uplink signals are received s34 from the gateways 10 over the uplink channels 12. Then, also at the satellite 14, for each one of the uplink signals, a downlink signal is derived s36 from the uplink signal, and the downlink signals are transmitted s32 towards Earth 22. The derivation s36 of the downlink signals from uplink signals in satellite 14 will be explained further below with reference to three constraints (constraints "C1", "C2", and "CB") as well as with reference to FIGS. 5 to 9.

Yet furthermore, as further illustrated in FIG. 2, inter-beam interference mitigation precoding s40 of signals intended to each of at least some of the plurality of non-space-based receiver locations 18 is performed prior to transmitting the downlink signals from satellite 14 towards Earth 22. That is, inter-beam interference mitigation precoding s40 is performed by applying the precoding weightings (generated in step s30) either at the gateway 10 where the precoding weightings have been generated (as will be discussed later with reference to FIG. 3a), or at the satellite 14 (as will be discussed later with reference to FIG. 3b).

In addition, in satellite 14, downlink signals are derived s36 from uplink signals in such a manner as to satisfy the three following constraints "C1", "C2", and "CB":

Constraint C1: a first downlink channel 16 is reused, in different beams among the plurality of beams 20, by at least two downlink signals derived from uplink signals originating from a first gateway among the plurality of gateways 10;

Constraint C2: a second downlink channel 16 is reused, in different beams among the plurality of beams 20, by at least two downlink signals derived from uplink signals originating from a second gateway among the plurality of gateways 10; and Constraint CB: there is at least one beam in common between the beams in which the first downlink channel is reused and the beams in which the second downlink channel is reused.

These constraints, which will be further explained with reference to FIGS. 5 to 9, together contribute to an effective inter-beam mitigation precoding processing by allowing the setting up of configurations in which a gateway 10 controls, as far as a downlink channel 16 is concerned, all the beams of a set of beams 20 among which intra-beam interference may occur. That is, a gateway 10 controls the beams 20 in the sense that the gateway 10 is in charge of generating the precoding weightings for all the beams of a set of beams 20 among which intra-beam interference may occur, as far as a specific downlink channel 16 is concerned. Assigning in that sense a specific downlink channel 16 to a specific gateway 10 enables a comprehensive, rather than partial, joint inter-beam mitigation processing.

In one embodiment, a more stringent constraint than constraint CB is used, namely constraint "CB1", defined as follows:

Constraint CB1: the beams in which the first downlink channel 16 is reused are the same as the beams in which the second downlink channel 16 is reused. In other words, in all the beams in which the first downlink channel 16 is reused, the second downlink channel 16 is also reused.

In one embodiment, an additional constraint is used (in addition to constraints C1, C2, and CB, or, alternatively, in addition to constraints C1, C2, and CB1), namely constraint "CC", defined as follows:

Constraint CC: for all of the beams 20 in which satellite 14 transmits (i.e., for each of the beams 20 in which satellite 14 transmits downlink signals), the first downlink channel 16 is only reused by downlink signals derived from the uplink signals from the first gateway, and the second downlink channel 16 is only reused by downlink signals derived from uplink signals from the second gateway.

FIG. 3a is a flowchart of a method in one embodiment of the invention, wherein the uplink signals transmitted to satellite 14 are generated at gateways 10 using the precoding weightings. In other words, the precoding per se is performed at the gateways 10.

In that embodiment, each gateway 10 generates s30 precoding weightings for inter-beam interference mitigation. The precoding weightings may for example be computed based on reporting information received, through the return link, from terminals located at non-space-based receiver locations 18 (as known in the art).

Each gateway 10 then generates s40a uplink signals based on signals obtained or received e.g. from the backbone network (i.e., based on signals to be transmitted to the terminals, such as IP packets or the like) and using the precoding weightings generated in step s30 (as also known in the art). The uplink signals are then transmitted s32 to satellite 14. In this embodiment, the uplink signals are therefore precoded uplink signals.

Satellite 14 then receives s34a the (precoded) uplink signals from the gateways 10. Downlink signals are then derived s36a from the uplink signals by changing, in frequency and/or polarization (i.e., in "color", which is a combination of frequency and polarization), at least one of the uplink signals received from each gateway 10. That is, at least one of the uplink signals from each gateway 10 is frequency-shifted and/or converted in polarisation at satellite 14. The downlink signals are then transmitted s38 towards Earth each in a specific beam 20.

Whether to frequency-shift an uplink signal received from a given gateway 10 on a given uplink channel 12, whether to convert the uplink signal in polarisation, or whether to derive a downlink signal from the uplink signal without any change in frequency or polarisation, is configured in satellite 14 for example using a digital processing and route switching device, such as for example a digital channelizer as described in ref. [8], or any type of digital transparent processor (DTP). A DTP may be defined as a device onboard a satellite that provides multiple input ports for analog uplink signals and multiple output ports for analog downlink signals, and that performs frequency conversion (and/or polarization conversion) and level adjustment for selected parts of the frequency band between selected pairs of input and output ports. The beam 20 onto which a downlink signal is to be transmitted is also configured in satellite 14 for example using said DTP. Likewise, the frequency-shifting itself (if applicable to a given uplink signal), the polarisation conversion itself (if applicable to a given uplink signal), and the routing to the specified beam 20 may also be carried out for example using said DTP.

In a sub-embodiment of the embodiment described with reference to FIG. 3a, the uplink channels of the set of uplink channels 12 may differ from each other by at least one of: (i) their frequency, or range of frequencies; and (ii) their polarization, or polarizations. This sub-embodiment is advantageous in that, by distinguishing the uplink channels 12 in frequency and/or polarisation, a gateway 10 may already apply in the uplink direction precisely the amplitude and phase weighting required on the downlink direction. This is because frequency conversion (from uplink to downlink channel frequency) and/or polarisation switching on board the satellite does not affect the amplitude and phase of the signals.

FIG. 3b is a flowchart of a method in one embodiment of the invention, wherein the precoding weightings generated at each of the gateways 10 are transmitted to the satellite 14 and then used in satellite 14 for precoding the uplink signals. In other words, the method of FIG. 3b differs from the method described with reference to FIG. 3a in that, in FIG. 3b, the precoding per se is performed at satellite 14 (rather than at gateways 10).

That is, each gateway 10 generates s30 precoding weightings as described above with reference to FIGS. 2 and 3a. The gateway 10 then transmits s32, s33 to satellite 14 the (non-precoded) uplink signals over uplink channels 12 as well as the precoding weightings.

Satellite 14 then receives s34b, from gateways 10, both the uplink signals and the precoding weightings. Satellite 14 then derives s36b downlink signals from the uplinks signals as described with reference to FIG. 3a but by also applying the received precoding weightings. The downlink signals are then transmitted s38 towards Earth each in a specific beam 20.

In a sub-embodiment of the embodiment described with reference to FIG. 3b, the uplink channels of the set of uplink channels 12 may differ from each other by at least one of: (i) their frequency, or range of frequencies; (ii) their polarization, or polarizations; (iii) their transmission time slot, or slots; and (iv) their spread-spectrum code, or codes. This sub-embodiment is advantageous in that the uplink channels 12 may be distinguished not only in frequency and/or polarisation, but also in the time slots or codes applied, since the gateways 10 do not perform the weighting, i.e. the precoding per se.

When using time slots in a time or code division multiplexing scheme on the uplink, satellite 14 has to demodulate and demultiplex the received uplink signals, and then modulate the downlink signals to be transmitted onto the beams 20. Demodulation delivers a bit stream, which by nature does not have any amplitude and phase information. Therefore, in such as case, gateways 10 cannot apply amplitude and phase weighting already on the uplink, i.e. prior to transmitting the uplink signals to satellite 14. However, since satellite 14 receives (as part of step s34b) the precoding weightings as side information from gateways 10, satellite 14 may apply these weightings and perform the precoding per se based on the received precoding weightings. As a result, if the precoding per se is performed in satellite 14 (rather than in gateways 10), gateways 10 may transmit, to satellite 14, the uplink signals as bit streams in whatever form, such as for example using an optical communication link for carrying a bit stream.

The embodiments described with reference to FIGS. 3a and 3b may be combined to form other embodiments. For example, in one embodiment, a system 10 may have a mixed configuration in which some gateways 10 transmit precoded uplink signals whereas the other gateways 10 transmit non-precoded uplink signals together with precoding weightings.

Now, before further discussing some embodiments of the invention with reference to FIGS. 5 to 9, a non-claimed configuration is described with reference to FIG. 4 for a better understanding of the context in which some embodiments of the invention have been developed.

Figure 4:
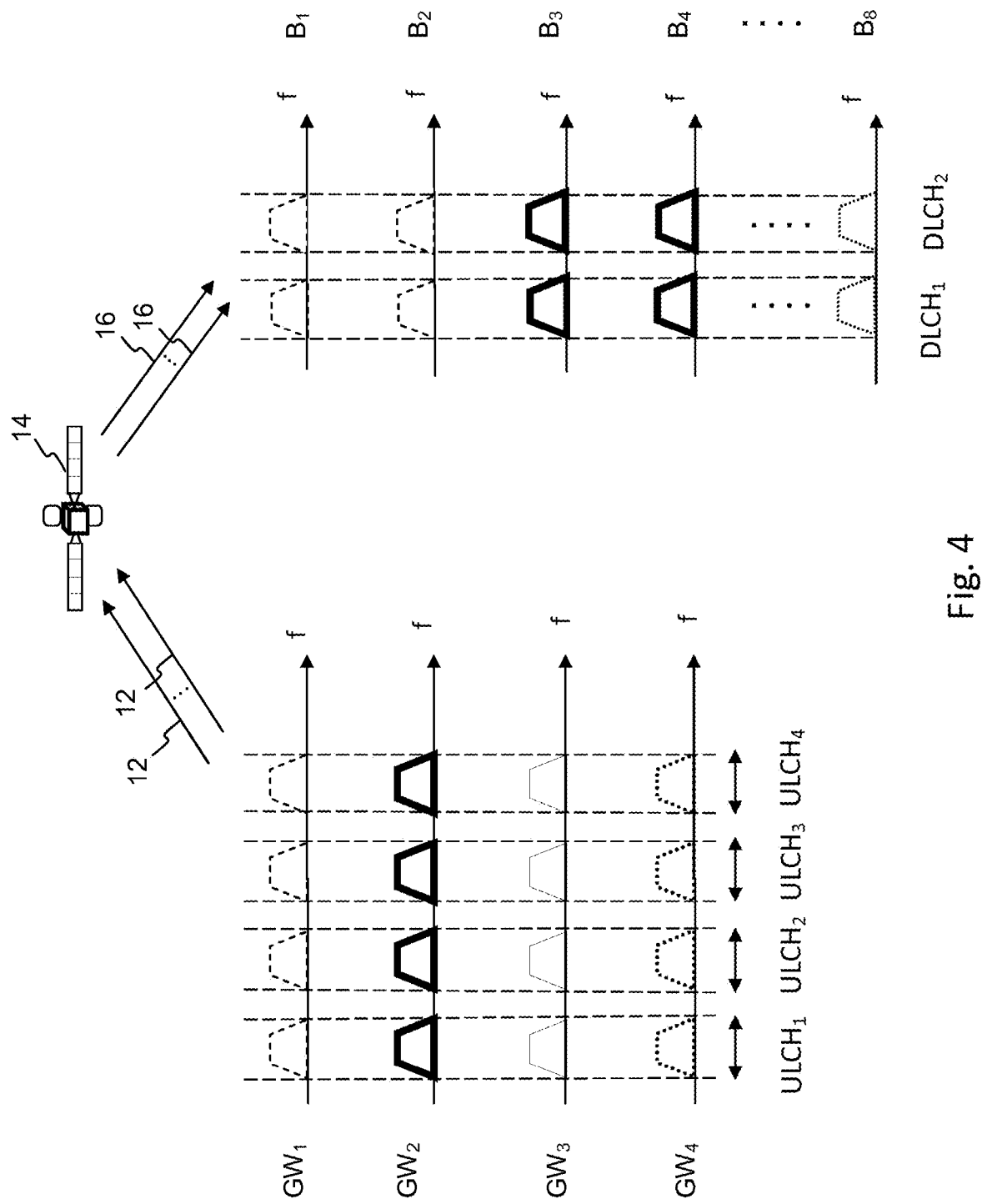
FIG. 4 schematically illustrates a configuration of uplink and downlink channels in a multi-beam satellite communications system in which each gateway controls a subset of the total number of beams, in accordance with a non-claimed example.

Namely, FIG. 4 schematically illustrates, in accordance with a non-claimed example, a configuration of uplink channels $ULCH_1$ to $ULCH_4$ and downlink channels $DLCH_1$ and $DLCH_2$ in a multi-beam satellite communication system in which each gateway $GW_1$ to $GW_4$ controls a subset of beams $B_1$ to $B_8$. Gateway $GW_1$ controls beams $B_1$ and $B_2$, gateway $GW_2$ controls beams $B_3$ and $B_4$, gateway $GW_3$ controls beams $B_5$ and $B_6$, and gateway $GW_4$ controls beams $B_7$ and $B_8$. That is, for example, gateway $GW_1$ is in charge of generating the precoding weightings for beams $B_1$ and $B_2$, and the downlink signals sent onto beams $B_1$ and $B_2$ originate from gateway $GW_1$. That is, above-described constraint CB is not satisfied. Constraint CB1 is a fortiori not satisfied either. In addition, constraint CC is not satisfied either.

The configuration of FIG. 4 only allows a partial, non-comprehensive central pre-coding processing for inter-beam interference mitigation in a gateway. This is because the gateway serves a subset of the beams, and it is consequently not possible to comprehensively mitigate the interference arising between beams associated with different gateways.

In FIG. 4, isosceles trapezoids represent, on the left-hand side of the figure, the uplink signals and, on the right-hand side, the downlink signals. As can be seen, the lines used for the trapezoids are of different types, i.e. dashed line, solid thick line, solid thin line, and dotted line. The same line types are used for some of the uplink and downlink signals, indicating how the uplink and downlink signals are mapped after rearrangement at the satellite. This manner of illustrating the uplink-channels-to-downlink-channels mapping is also used in FIGS. 5, 6, 7, and 9.

Figure 5:
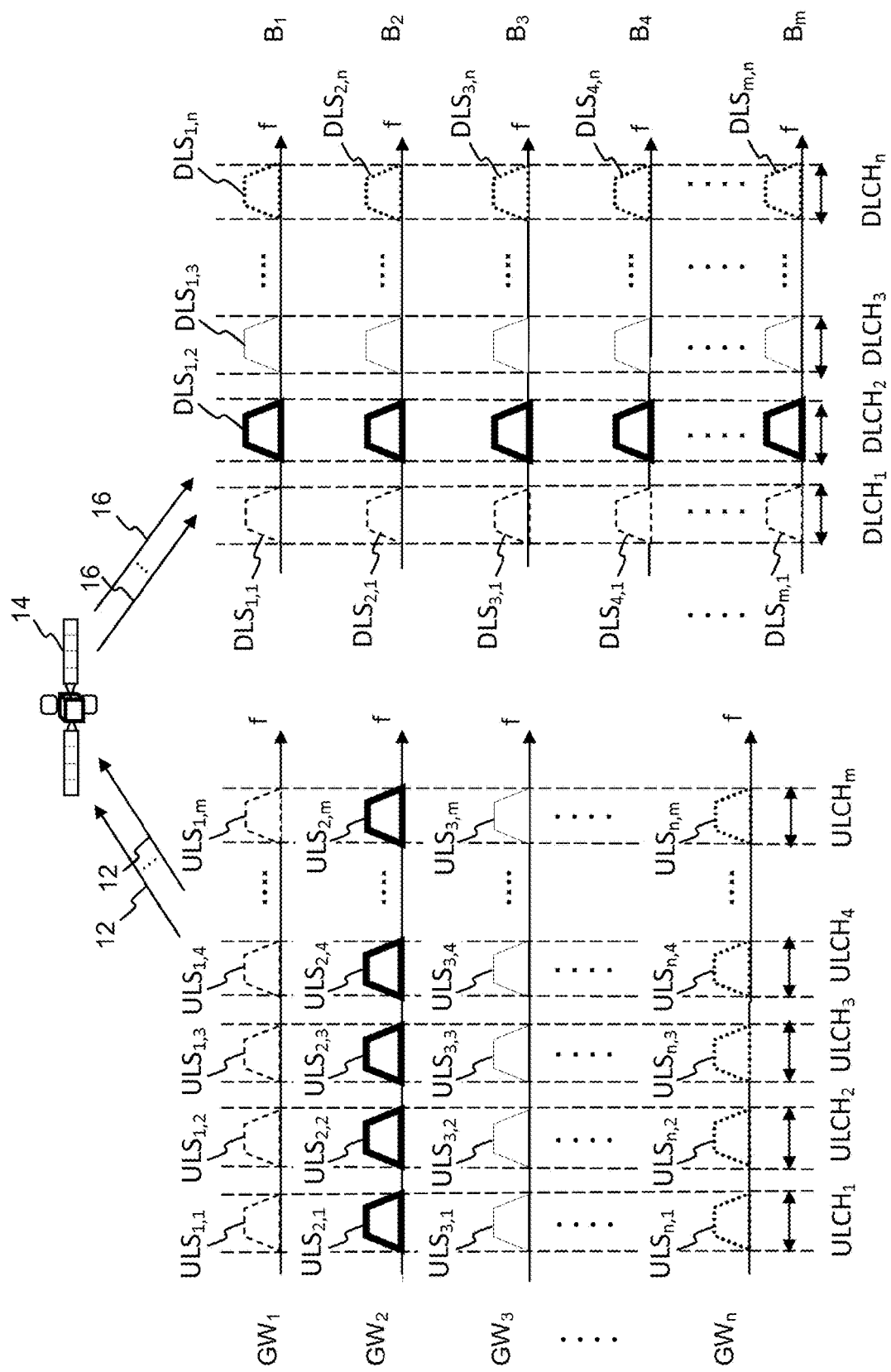
FIG. 5 schematically illustrates a configuration of uplink and downlink channels in a multi-beam satellite communications system, in one embodiment of the invention.

FIG. 5 schematically illustrates an exemplary configuration of uplink and downlink channels in a multi-beam satellite communications system 100 in one embodiment of the invention. The configuration involves n gateways $GW_1$ to $GW_n$ (with n being a positive integer larger than 1), m uplink channels $ULCH_1$ to $ULCH_m$ (with m being a positive integer larger than 1), m beams $B_1$ to $B_m$, and n downlink channels $DLCH_1$ to $DLCH_n$. The m uplink channels $ULCH_1$ to $ULCH_m$ are dividing, in frequency and/or polarization, the available uplink frequency band. Likewise, the n downlink channels $DLCH_1$ to $DLCH_n$ are dividing, in frequency and/or polarization, the available downlink frequency band. The configuration of FIG. 5 satisfies all of constraints C1, C2, CB, CB1, and CC.

In particular, the mapping in the configuration of FIG. 5 is as follows, wherein $ULS_{i,j}$ is the uplink signal from gateway $GW_i$ transmitted on uplink channel $ULCH_j$, and $DLS_{k,l}$ is the downlink signal transmitted on beam $B_k$ on downlink channel $DLCH_l$:

$$\{ULS_{1,1}, ULS_{1,2}, \ldots, ULS_{1,m}\} \rightarrow \{DLS_{1,1}, DLS_{2,1}, \ldots, DLS_{m,1}\}$$
$$\{ULS_{2,1}, ULS_{2,2}, \ldots, ULS_{2,m}\} \rightarrow \{DLS_{1,2}, DLS_{2,2}, \ldots, DLS_{m,2}\}$$
$$\ldots$$
$$\{ULS_{n,1}, ULS_{n,2}, \ldots, ULS_{n,m}\} \rightarrow \{DLS_{1,n}, DLS_{2,n}, \ldots, DLS_{m,n}\}$$

In other words, all of the downlink signals transmitted through downlink channel $DLCH_1$ on all beams $B_1$ to $B_m$ are derived from, i.e. originate from, uplink signals from gateway $GW_1$. Likewise, all of the downlink signals transmitted through downlink channel $DLCH_2$ on all beams $B_1$ to $B_m$ are derived from, i.e. originate from, uplink signals from gateway $GW_2$. The same applies, mutatis mutandis, to the other downlink channels. In such a manner, a specific downlink channel 16 is assigned to a specific gateway 10, thus enabling a comprehensive, rather than partial, joint inter-beam mitigation processing.

Figure 6:
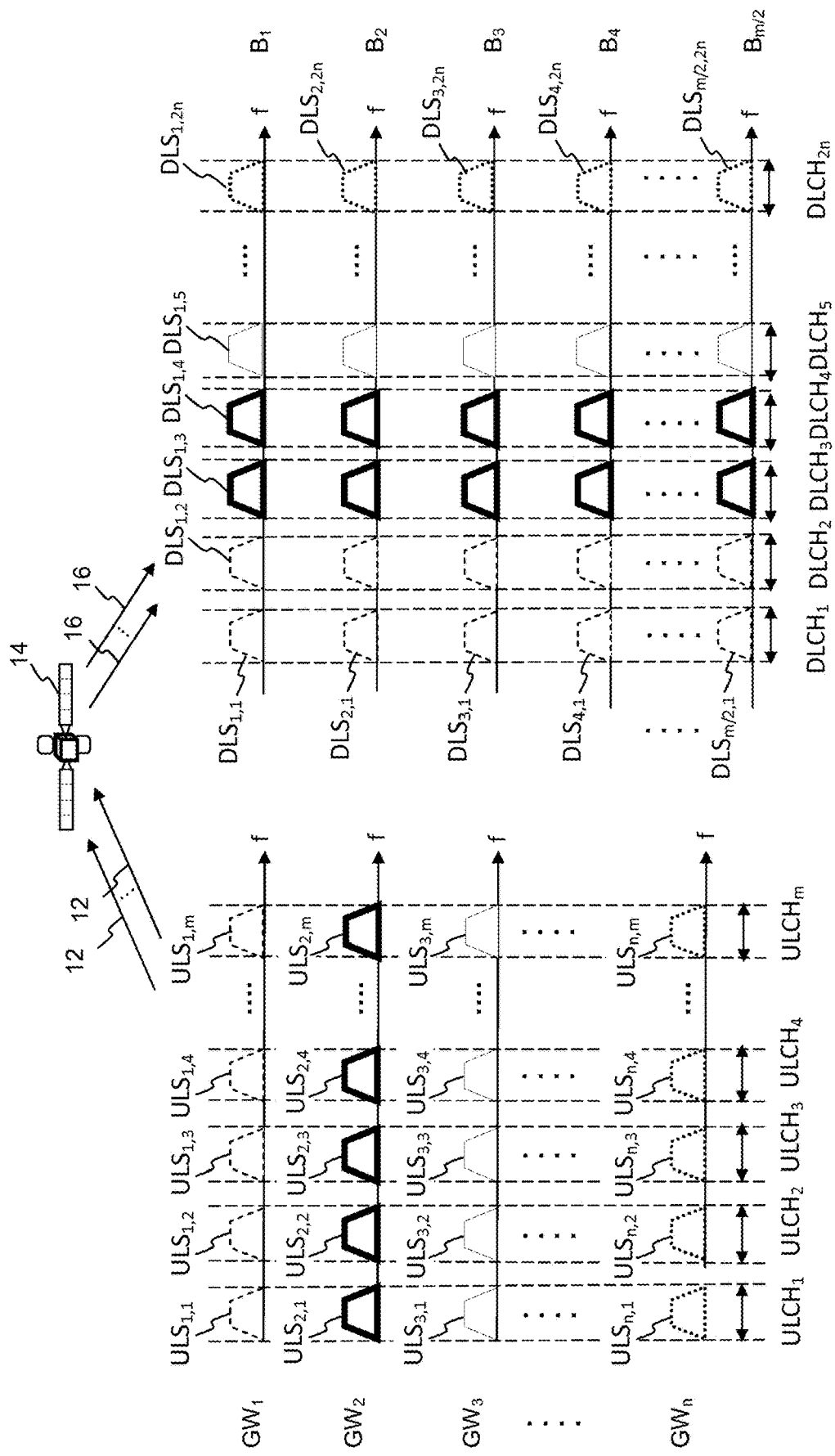
FIG. 6 schematically illustrates another configuration of uplink and downlink channels in a multi-beam satellite communications system, in one embodiment of the invention.

FIG. 6 schematically illustrates another exemplary configuration of uplink and downlink channels in a multi-beam satellite communication system 100 in one embodiment of the invention. The configuration involves n gateways $GW_1$ to $GW_n$ (with n being a positive integer larger than 1), m uplink channels $ULCH_1$ to $ULCH_m$ (with m being a positive even integer larger than 3), m/2 beams $B_1$ to $B_{m/2}$, and 2 times n (i.e., 2·n) downlink channels $DLCH_1$ to $DLCH_{2n}$. The m uplink channels $ULCH_1$ to $ULCH_m$ are dividing, in frequency and/or polarization, the available uplink frequency band. Likewise, the 2·n downlink channels $DLCH_1$ to $DLCH_{2n}$ are dividing, in frequency and/or polarization, the available downlink frequency band. The configuration of FIG. 6 satisfies all of constraints C1, C2, CB, CB1, and CC.

In particular, the mapping in the configuration of FIG. 6 is as follows:

$$\{ULS_{2,1}, ULS_{2,2}, \ldots, ULS_{2,m}\} \rightarrow$$
$$\{DLS_{1,3}, DLS_{2,3}, \ldots, DLS_{m/2,3}, DLS_{1,4}, DLS_{2,4}, \ldots, DLS_{m/2,4}\}$$
$$\ldots$$
$$\{ULS_{n,1}, ULS_{n,2}, \ldots, ULS_{n,m}\} \rightarrow \{DLS_{1,2n-1}, DLS_{2,2n-1},$$
$$\ldots, DLS_{m/2,2n-1}, DLS_{1,2n}, DLS_{2,2n}, \ldots, DLS_{m/2,2n}\}$$

In other words, all of the downlink signals transmitted through downlink channels $DLCH_1$ and $DLCH_2$ on all beams $B_1$ to $B_{m/2}$ are derived from, i.e. originate from, uplink signals from gateway $GW_1$. Likewise, all of the downlink signals transmitted through downlink channels $DLCH_3$ and $DLCH_4$ on all beams $B_1$ to $B_{m/2}$ are derived from, i.e. originate from, uplink signals from gateway $GW_2$. The same applies, mutatis mutandis, to the other downlink channels. In such a manner, a specific downlink channel 16 is assigned to a specific gateway 10, thus enabling a comprehensive, rather than partial, joint inter-beam mitigation processing.

Figure 7:
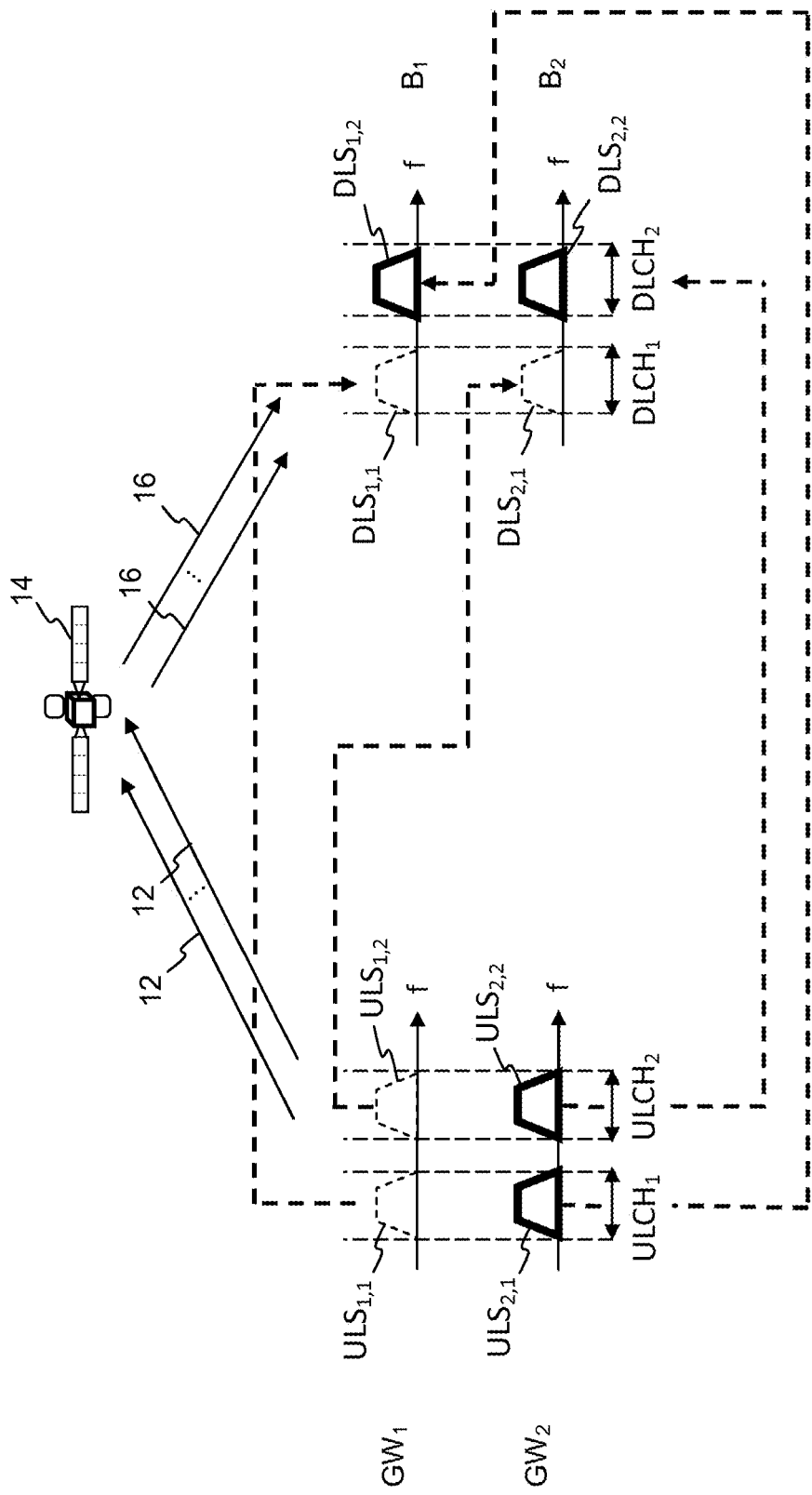
FIG. 7 schematically illustrates yet another configuration of uplink and downlink channels in a multi-beam satellite communications system, in one embodiment of the invention.

FIG. 7 schematically illustrates the exemplary configuration described with reference to FIG. 5, but specifically with n=2 and m=2, in one embodiment of the invention. That is, the configuration involves two gateways $GW_1$ and $GW_2$, two uplink channels $ULCH_1$ and $ULCH_2$, two beams $B_1$ and $B_2$, and two downlink channels $DLCH_1$ and $DLCH_2$. The configuration satisfies all of constraints C1, C2, CB, CB1, and CC.

The mapping in the configuration of FIG. 7 is as follows:
$$\{ULS_{1,1}, ULS_{1,2}\} \rightarrow \{DLS_{1,1}, DLS_{2,1}\}$$
$$\{ULS_{2,1}, ULS_{2,2}\} \rightarrow \{DLS_{1,23} DLS_{2,2}\}$$

That is, gateway $GW_1$ transmits, to satellite 14, uplink signal $ULS_{1,1}$ on uplink channel $ULCH_1$ and uplink signal $ULS_{1,2}$ on uplink channel $ULCH_2$. Gateway $GW_2$ transmits, to satellite 14, uplink signal $ULS_{2,1}$ on uplink channel $ULCH_1$ and uplink signal $ULS_{2,2}$ on uplink channel $ULCH_2$.

Let's assume, as a purely exemplary configuration, that uplink channel $ULCH_1$ uses the same frequency, or more precisely the same frequency sub-band, as downlink channel $DLCH_1$, that uplink channel $ULCH_2$ uses the same frequency sub-band as downlink channel $DLCH_2$, and that channels $ULCH_1$, $ULCH_2$, $DLCH_1$, and $DLCH_2$ all use the same polarisation, such as for example RHCP. In such a case, satellite 14 may derive s36 the downlink signals merely by (a) amplifying received uplink signal $ULS_{1,1}$ and transmitting it as downlink signal $DLS_{1,1}$ on beam $B_1$; (b) amplifying received uplink signal $ULS_{1,2}$, frequency-shifting it from $ULCH_2$ to $DLCH_1$ to form $DLS_{2,1}$ and transmitting it on beam $B_2$; (c) amplifying received uplink signal $ULS_{2,1}$, frequency-shifting it from $ULCH_1$ to $DLCH_2$ to form $DLS_{1,2}$ and transmitting it on beam $B_1$; and (d) amplifying received uplink signal $ULS_{2,2}$ and transmitting it as downlink signal $DLS_{2,2}$ on beam $B_2$. Therefore, in this configuration, only two frequency-shifts are necessary. $ULS_{1,1}$ and $ULS_{2,2}$ may be transparently forwarded as $DLS_{1,1}$ and $DLS_{2,2}$ without any frequency shift.

In the embodiments of FIGS. 5, 6, and 7, which all satisfy above-described constraints C1, C2, and CB, each downlink channel over all downlink beams is effectively controlled by a single gateway, so that joint inter-beam interference mitigation is possible at the controlling gateway.

Figure 8:
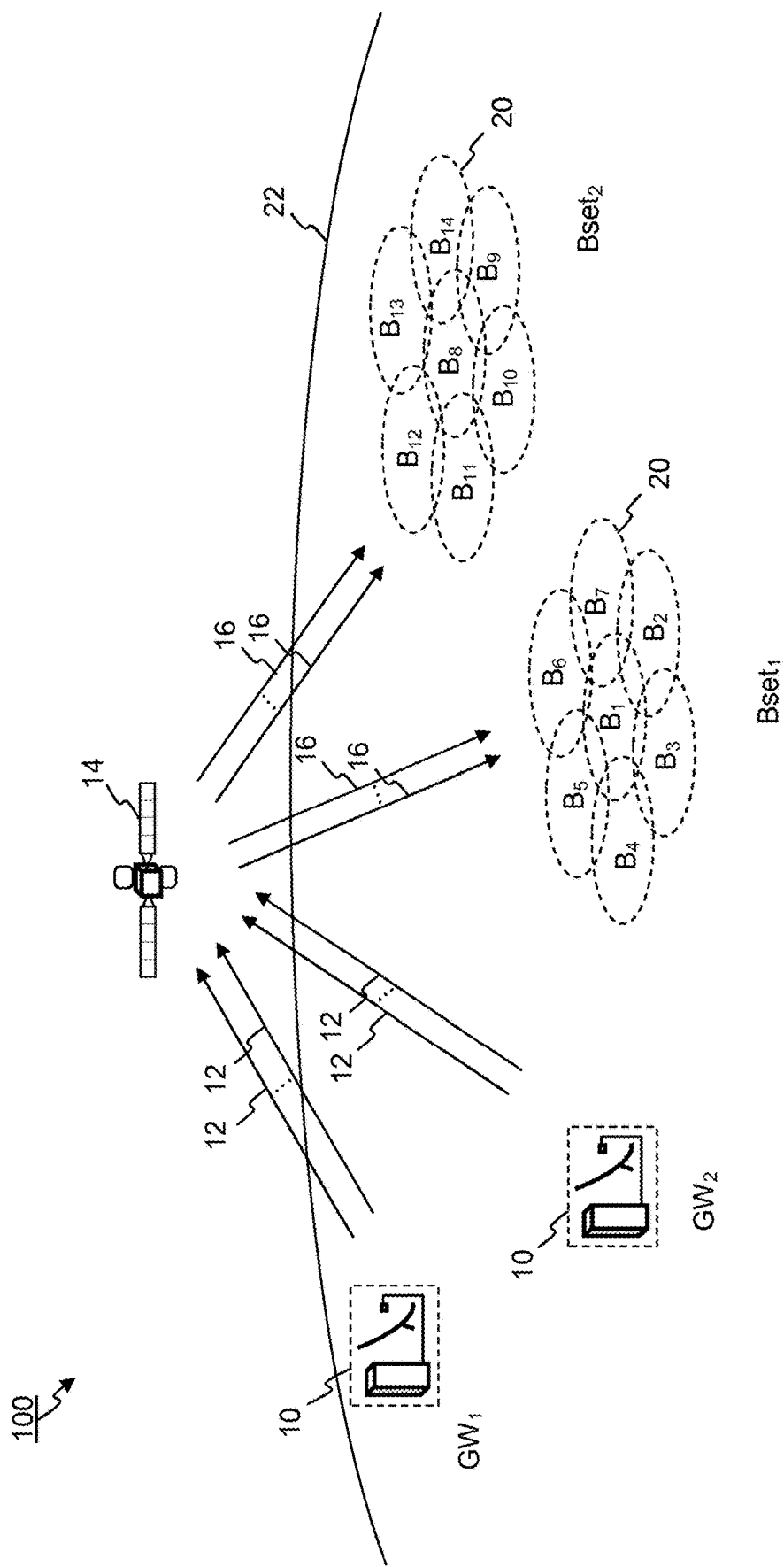
FIG. 8 schematically illustrates a multi-beam satellite communications system in one embodiment of the invention.
Figure 9:
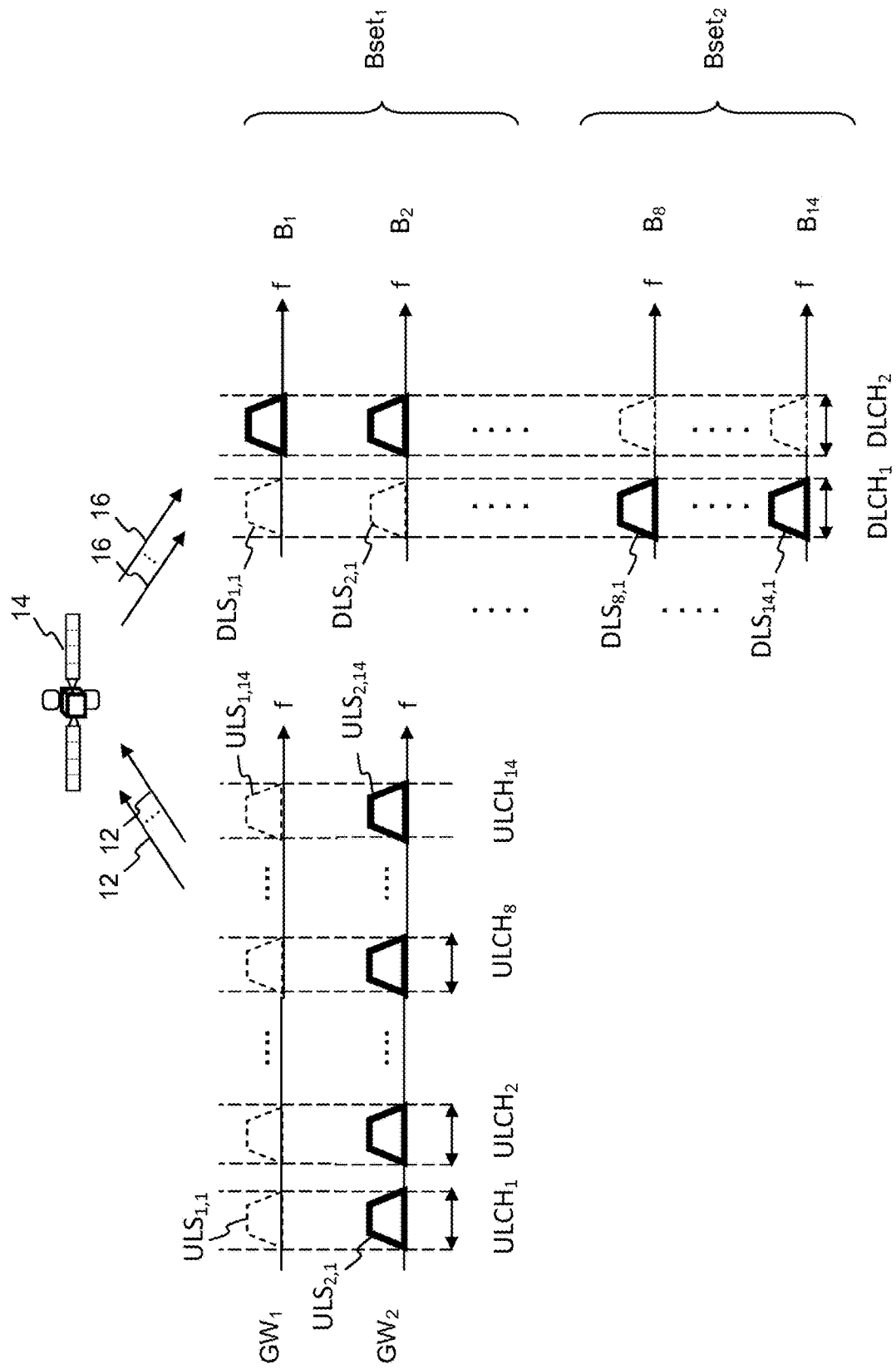
FIG. 9 schematically illustrates a configuration of uplink and downlink channels in a multi-beam satellite communications system, which may be used with the system of FIG. 8, in one embodiment of the invention.

FIGS. 8 and 9 show an exemplary multi-beam satellite communications system 100 and an associated configuration of uplink and downlink channels, in another embodiment of the invention.

The configuration involves two gateways $GW_1$ and $GW_2$, 14 uplink channels $ULCH_1$ to $ULCH_{14}$, 14 beams $B_1$ to $B_{14}$, and 2 downlink channels $DLCH_1$ and $DLCH_2$. Beams $B_1$ to $B_{14}$ are divided into two sets of beams, i.e. $Bset_1$ and $Bset_2$, wherein beam set $Bset_1$ comprises beams $B_1$ to $B_7$ and beam set $Bset_2$ comprises beams $B_8$ to $B_{14}$. As schematically illustrated in FIG. 8, the two beam sets $Bset_1$, $Bset_2$ are located sufficiently far apart from each other that there is no inter-beam interference between the two sets, or the interference is at least negligible, i.e. negligible compared to other impairments of the signals. That is, the two subsets are sufficiently far apart from each other so that the interferences between the downlink signals transmitted in the beams of the first beam subset $B_1$ and the downlink signals transmitted in the beams of the second beam subset $B_2$ are negligible. The configuration of FIG. 9 satisfies all of constraints C1, C2, CB, and CB1, but not constraint CC.

That is, the mapping in the configuration of FIG. 9 is as follows:

{$ULS_{1,1}$, $ULS_{1,2}$, ..., $ULS_{1,14}$}→{$DLS_{1,1}$, $DLS_{2,1}$, ... $DLS_{7,1}$, $DLS_{8,2}$, $DLS_{9,2}$ ... $DLS_{14,2}$}

{$ULS_{2,1}$, $ULS_{2,2}$, ..., $DLS_{2,14}$}→{$DLS_{1,2}$, $DLS_{2,2}$, ... $DLS_{7,2}$, $DLS_{8,1}$, $DLS_{9,1}$, ... $DLS_{14,1}$}

In this embodiment, downlink channel $DLCH_1$ over all downlink beams of beam set $Bset_1$ is controlled by gateway $GW_1$, downlink channel $DLCH_1$ over all downlink beams of beam set $Bset_2$ is controlled by gateway $GW_2$, downlink channel $DLCH_2$ over all downlink beams of beam set $Bset_1$ is controlled by gateway $GW_2$, and downlink channel $DLCH_2$ over all downlink beams of beam set $Bset_2$ is controlled by gateway $GW_1$. In such a manner, an effective joint inter-beam interference mitigation is possible on a per-beam-set manner at the gateways.

Figure 10:
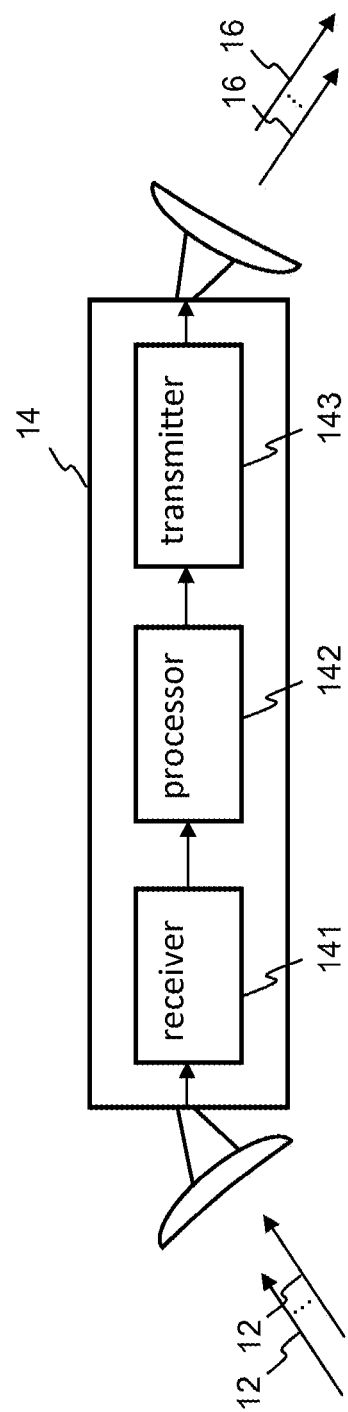
FIG. 10 schematically illustrates some components of a satellite in one embodiment of the invention.

FIG. 10 schematically illustrates some components of a satellite 14 in one embodiment of the invention, which may be used for carrying out the above-described methods. In particular, satellite 14 is configured for enabling communication from a plurality of gateways to satellite 14 over a set of uplink channels 12 and then from satellite 14 towards a plurality of non-space-based receiver locations (where user terminals may be located), wherein satellite 14 is configured to transmit towards Earth 22 in a plurality of beams 20. Satellite 14 comprises a receiver 141, a processor 142, and a transmitter 143. Receiver 141 is configured for receiving uplink signals from the plurality of gateways 10 over the uplink channels 12. Processor 142 configured for deriving, for each of the uplink signals, a downlink signal from the uplink signal. Finally, transmitter 143 is configured for transmitting the downlink signals towards Earth 22. In addition, satellite 14 is configured so that, and in particular receiver 141, processor 142, and transmitter 143 are configured so that, in operation, above-described constraints C1, C2, and CB are satisfied, which enables an effective inter-beam interference mitigation.

In one embodiment, processor 142 is a digital transparent processor (DTP). Digital processing is advantageous in that techniques such as the fast Fourier transform (FFT) or polyphase filter bank (PFB) techniques, which split up signals into slices of the frequency band, may be used.

Where the terms "receiver" 141, "processor" 142, "transmitter" 143, etc. are used herewith, no restriction is made regarding how distributed these elements may be and regarding how gathered elements may be. That is, the constituent elements thereof may be distributed in different software or hardware components or devices for bringing about the intended function. A plurality of distinct elements may also be gathered for providing the intended functionalities.

Any one of the above-referred elements of a gateway or a satellite may be implemented in hardware, software, field-programmable gate array (FPGA), application-specific integrated circuit (ASICs), and/or firmware, or the like.

In further embodiments of the invention, any one of the above-mentioned receiver 141, processor 142, transmitter 143, etc. is replaced by receiving means 141, processing means 142, transmitting means 143, etc. respectively, or, by a receiving unit 141, processing unit 142, transmitting unit 143, etc. for performing the functions of the above-mentioned receiver 141, processor 142, transmitter 143, etc.

In further embodiments of the invention, any one of the above-described steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

Abbreviations

B beam
Bset beam set
DLCH downlink channel
DLS downlink signal
DTP digital transparent processor
f frequency
FFT fast Fourier transform
GW gateway
IP Internet Protocol
LHCP left-hand circular polarisation
MU-MIMO multi-user multiple-input multiple-output
PFB polyphase filter bank
RHCP right-hand circular polarisation
ULCH uplink channel
ULS uplink signal

REFERENCES

[1] Christopoulos, D., "Multibeam Joint Processing in Satellite Communications", Dissertation, University of Luxembourg, Luxembourg, 2014, available at the time of writing from http://orbilu.uni.lu/handle/10993/21721

[2] US 2017/0149493 A1

[3] G. Caire, M. Debbah, L. Cottatellucci, R. De Gaudenzi, R. Rinaldo, R. Mueller, G. Gallinaro, "Perspectives of adopting interference mitigation techniques in the context of broadband multimedia satellite systems," in 23rd AIAA International Communications Satellite Systems Conference, ICSSC 2005 Rome, Italy, 1-5 (September 2005).

[4] J. Arnau, B. Devillers, C. Mosquera and A. Pérez-Neira, "Performance study of multiuser interference mitigation schemes for hybrid broadband multibeam satellite architectures," EURASIP Journal on Wireless Communications and Networking, 2012.

[5] G. Zheng, S. Chatzinotas, and B. Ottersten, "Multi-gateway cooperation in multibeam satellite systems," in Proc. of 23rd IEEE symp. on Person. Indoor Mob. Radio Commun., 2012.

[6] D. Christopoulos, S. Chatzinotas, G. Zheng, J. Grotz, and B. Ottersten, "Linear and non-linear techniques for multibeam joint processing in satellite communications," EURASIP Journal on Wireless Communications and Networking 2012, 2012:162. Available at the time of writing from http://jwcn.eurasipjournals.com/content/2012/1/162

[7] D. Christopoulos, P.-D. Arapoglou, S. Chatzinotas, and B. Ottersten, "Linear precoding in multibeam satcoms: Practical constraints," in 31st AIAA International Communications Satellite Systems Conference (ICSSC), Florence, IT, October 2013.

[8] Ejima, Minoru Akita, Akinori Fujimura, "Digital Channelizer for High Throughput Satellite Communications", Mitsubishi Electric ADVANCE September 2014, pp.

7-10. Available at the time of writing from http://www.mitsubishielectric.com/company/rd/advance/pdf/vol147/147_TR3.pdf

The invention claimed is:

1. Method for communication from a plurality of gateways to a satellite over a set of uplink channels and then from the satellite towards a plurality of non-space-based receiver locations, wherein the satellite transmits towards Earth in a plurality of beams, the method comprising:
before transmission from the satellite towards Earth, inter-beam interference mitigation precoding of signals intended to each of at least some of the plurality of non-space-based receiver locations;
at each of the plurality of gateways:
generating weightings, hereinafter referred to as "precoding weightings", for the inter-beam interference mitigation precoding; and
transmitting, from the gateway to the satellite, for each of the set of uplink channels, a signal, hereinafter referred to as "uplink signal", over the uplink channel; and
at the satellite:
receiving the uplink signals from the plurality of gateways over uplink channels;
for each of the uplink signals, deriving a signal, hereinafter referred to as "downlink signal", from the uplink signal; and
transmitting the downlink signals towards Earth, wherein:
a first downlink channel is reused, in different beams among the plurality of beams, by at least two downlink signals derived from uplink signals from a first gateway among the plurality of gateways, and
a second downlink channel is reused, in different beams among the plurality of beams, by at least two downlink signals derived from uplink signals from a second gateway among the plurality of gateways,
wherein there is at least one beam in common between the beams in which the first downlink channel is reused and the beams in which the second downlink channel is reused.

2. Method of claim 1, further comprising:
at each of the plurality of gateways, generating, using the precoding weightings, the uplink signals by inter-beam interference mitigation precoding of signals intended to each of at least some of the plurality of non-space-based receiver locations;
wherein, for at least one of the uplink signals from each gateway, deriving a downlink signal from an uplink signal comprises changing, in at least one of frequency and polarization, the uplink signal.

3. Method of claim 2, wherein the uplink channels of the set of uplink channels differ from each other by at least one of:
their frequency, or range of frequencies; and
their polarization, or polarizations.

4. Method of claim 1, further comprising:
at each of the plurality of gateways, transmitting, from the gateway to the satellite, the precoding weightings;
wherein deriving a downlink signal from an uplink signal makes use of at least one of the precoding weightings for inter-beam interference mitigation precoding.

5. Method of claim 4, wherein the uplink channels of the set of uplink channels differ from each other by at least one of:
their frequency, or range of frequencies;
their polarization, or polarizations;
their transmission time slot, or slots; and
their spread-spectrum code, or codes.

6. Method according to claim 1, wherein the first downlink channel and the second downlink channel differ from each other by
their frequency, or range of frequencies; and
their polarization, or polarizations.

7. Method according to claim 1, wherein the beams in which the first downlink channel is reused are the same as the beams in which the second downlink channel is reused.

8. Method according to claim 1, wherein, for all of the beams in which the satellite is transmitting, the first downlink channel is only reused by downlink signals derived from the uplink signals from the first gateway, and the second downlink channel is only reused by downlink signals derived from uplink signals from the second gateway.

9. Method according to claim 1, wherein deriving a downlink signal from an uplink signal is carried out using at least one of:
a digital transparent processor; and
a digital channelizer.

10. Method according to claim 1, wherein at least some of the uplink channels of the set of uplink channels are carried on at least one optical link.

11. Satellite configured for enabling communication from a plurality of gateways to the satellite over a set of uplink channels and then from the satellite towards a plurality of non-space-based receiver locations, wherein the satellite is configured to transmit towards Earth in a plurality of beams, the satellite comprising:
a receiver configured for receiving signals, hereinafter referred to as "uplink signals", from the plurality of gateways over the uplink channels;
a processor configured for deriving, for each of the uplink signals, a signal, hereinafter referred to as "downlink signal", from the uplink signal; and
a transmitter configured for transmitting the downlink signals towards Earth;
wherein the satellite is configured so that, in operation,
a first downlink channel is reused, in different beams among the plurality of beams, by at least two downlink signals derived from uplink signals from a first gateway among the plurality of gateways, and
a second downlink channel is reused, in different beams among the plurality of beams, by at least two downlink signals derived from uplink signals from a second gateway among the plurality of gateways,
wherein there is at least one beam in common between the beams in which the first downlink channel is reused and the beams in which the second downlink channel is reused.

12. Satellite of claim 11, further configured so that, in operation, the beams in which the first downlink channel is reused are the same as the beams in which the second downlink channel is reused.

13. Satellite of claim 11, further configured so that, in operation, for all of the beams in which the satellite is transmitting, the first downlink channel is only reused by downlink signals derived from the uplink signals from the first gateway, and the second downlink channel is only reused by downlink signals derived from uplink signals from the second gateway.

14. Satellite according to claim 11, wherein the processor comprises at least one of:
a digital transparent processor; and
a digital channelizer.

15. System comprising a satellite according to claim 11, and the plurality of gateways, wherein
- the system is configured for, before transmission from the satellite towards Earth, inter-beam interference mitigation precoding signals intended to each of at least some of the plurality of non-space-based receiver locations; and
- each of the plurality of gateways is configured for
  - generating weightings, hereinafter referred to as "precoding weightings", for the inter-beam interference mitigation precoding; and
  - transmitting, to the satellite, for each of the set of uplink channels, the uplink signals over the uplink channel.

16. Use of a satellite according to claim 11 for communication from the plurality of gateways to the satellite over the set of uplink channels and then from the satellite towards the plurality of non-space-based receiver locations, wherein the satellite transmits towards Earth in the plurality of beams.

* * * * *